United States Patent
Kawai

(10) Patent No.: US 6,597,484 B1
(45) Date of Patent: Jul. 22, 2003

(54) TWO-WAY COMBINATION OPTICAL SYSTEM UNIT

(75) Inventor: Motoyoshi Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/469,392

(22) Filed: Dec. 22, 1999

(30) Foreign Application Priority Data

Dec. 25, 1998 (JP) .......................................... 10-371028

(51) Int. Cl.[7] .................... H04B 10/145; H04B 10/148; G02B 6/36
(52) U.S. Cl. ......................... 359/173; 359/154; 385/52; 385/89; 385/92
(58) Field of Search .............................. 385/52, 88–89, 385/92; 359/154, 173

(56) References Cited

U.S. PATENT DOCUMENTS

| 5,333,225 A | * | 7/1994 | Jacobowitz et al. | ......... 333/254 |
| 5,913,002 A | * | 6/1999 | Jiang | ........................... 385/88 |
| 6,256,437 B1 | * | 7/2001 | Sakushima et al. | ......... 385/147 |
| 6,328,484 B1 | * | 12/2001 | Uebbing | ..................... 385/47 |

FOREIGN PATENT DOCUMENTS

| EP | 0 442 608 A2 | 8/1991 |
| JP | 07113924 | 5/1995 |
| JP | 7-113924 | 5/1995 |
| JP | 08271767 | 10/1996 |
| JP | 9-171127 | 6/1997 |
| JP | 09325243 | 12/1997 |
| JP | 9-325243 | 12/1997 |
| JP | 10-268166 | 10/1998 |

OTHER PUBLICATIONS

Kenneth H. Hahn, et al., "Gigabyte/s Data Communications with the POLO Parallel Optical Link," *IEEE*, 1996 Electronic Components and Technology Conference, pp. 301–307, XP 000684903.

* cited by examiner

Primary Examiner—Akm E. Ullah
Assistant Examiner—Jerry T Rahll
(74) Attorney, Agent, or Firm—Young & Thompson

(57) ABSTRACT

A V-shaped profile is on both sides of a silicon substrate. A light emitting element is mounted on one side and a light receiving element is mounted on the opposite side. An optical connector is constituted by molding integrally an optical fiber for transmission coupled to the light emitting element with an optical fiber for light reception coupled to the light receiving element. The respective extreme end surfaces of the optical fibers on the molded sides of the optical fibers for transmission as well as for light reception are served for light transmitting and receiving ends. When a thickness of the substrate is equal to a distance between both the optical fibers for transmission and reception as well as to a thickness between both the optical fibers contained in an optical connector, no polymer light waveguide for adjusting a distance between fibers is required.

15 Claims, 5 Drawing Sheets

TWO-WAY COMBINATION OPTICAL SYSTEM UNIT

FIELD OF THE INVENTION

The present invention relates to a two-way combination optical system unit used for a receptacle-capable optical transceiver.

BACKGROUND OF THE INVENTION

Heretofore, a two-way combination optical system unit is constituted, e.g., for the use of a receptacle-capable optical transceiver. As described above, an optical transceiver in which a transmitting function is integrated with a receiving function is widely employed in a field of data communication wherein optical fibers are used. Particularly, as described in "OPTCOM" (the April 1998 issue, page 60), a development for a receptacle-capable compact optical transceiver compliant with a small size twine core array terminal (for example, MT ferrule specified in IEC874-16) has been pursued.

On one hand, there is an optical system unit wherein an optical semiconductor device is mounted on an Si substrate, and further fibers are mounted in V-grooves defined on the Si substrate, whereby the optical semiconductor device is optically coupled with the fibers. A structure of such optical system unit is shown in Kurata et al. "Developments in Surface-mount Optical Module" (lecture number SC-1-12) in a collection of lectures in the great meeting of electronics society in the '95 Institute of Electronics, Information and Communication Engineers.

In the case where this optical system unit is applied to the above described receptacle-capable compact optical transceiver, a fiber distance in an MT ferrule is 0.75 mm and it is very narrow. Thus, it is difficult to mount two V-grooves as well as light-emitting and light-receiving semiconductor devices onto the same Si substrate, because the structure becomes complicated. Moreover, there is also such a problem that since a distance defined between a transmitting section and light-receiving section is close to each other, electrical crosstalk occurs easily.

Heretofore, to solve the above described problem, an optical connector is optically connected with an optical system unit through a polymer light waveguide for adjusting distance as described in IEEE Proceedings of the 46th Elec., Comp. and Tech. Conf., K. H. Hahn et al. (pp. 301–307).

In this respect, however, the number of parts and the number of manufacturing man-hours increase, besides one more position to be connected increases in the above described conventional manner. In addition, there is also a negative problem where there is no effect for improving electrical crosstalk.

SUMMARY OF THE INVENTION

Accordingly, an object of the present invention is to provide a two-way combination optical system unit which results in a less number of parts and manufacturing man-hours, besides resulting in low connection loss.

According to the feature of the invention, a two-way combination optical system unit, comprises:

a light emitting element mounted on a side of a first prescribed substrate on which a V-shaped groove has been defined, a light receiving element mounted on a side of a second prescribed substrate on which a V-shaped groove has been defined, and a molded optical connector in which an optical fiber for light transmission connected to the light emitting element is molded integrally with an optical fiber for light reception connected to the light receiving element, and end surfaces of the optical fibers are exposed on a side surface thereof to be served for light transmitting and receiving ends.

In the preferred embodiment, the side of the first prescribed substrate and the side of the second prescribed substrate may be the sides of a common substrate which are opposite to each other.

In the preferred embodiment, the first prescribed substrate may be a substrate different from the second prescribed substrate, the other side opposite to the side of the first prescribed substrate may be bonded to the other side opposite to the side of the second prescribed substrate each other.

In the preferred embodiment, the common substrate may be an Si substrate, and a distance defined between the optical fiber for light transmission and the optical fiber for light reception may be allowed to coincide with a distance between the optical fibers required for the optical connector.

In the preferred embodiment, the first and second prescribed substrates may be Si substrate and a distance defined between the optical fiber for light transmission and the optical fiber for light reception may be allowed to coincide with a distance between the optical fibers required for the optical connector.

In the preferred embodiment, surfaces of the first and second prescribed substrates may be metallized.

In the preferred embodiment, the surfaces metallized may be conductive so as to be capable of ground connection.

In the preferred embodiment, one or both of the sides of the first and second prescribed substrates may be bonded to a surface of a prescribed package.

In the preferred embodiment, the surface of the package is conductive to be grounded.

In the preferred embodiment, the molded optical connector may be provided on the side surface thereof with guide pins for positioning the optical fibers for transmission and reception.

BRIEF DESCRIPTION OF THE DRAWINGS

The present invention will be explained in more detail in conjunction with appended drawings, wherein.

DESCRIPTION OF THE PREFERRED EMBODIMENTS

In the following, preferred embodiments of a two-way combination optical system unit according to the present invention will be described by referring to the accompanying drawings wherein FIGS. 1 through 5 illustrate preferred embodiments of a two-way combination optical system unit according to the present invention, respectively.

(First Preferred Embodiment)

Figure 1:
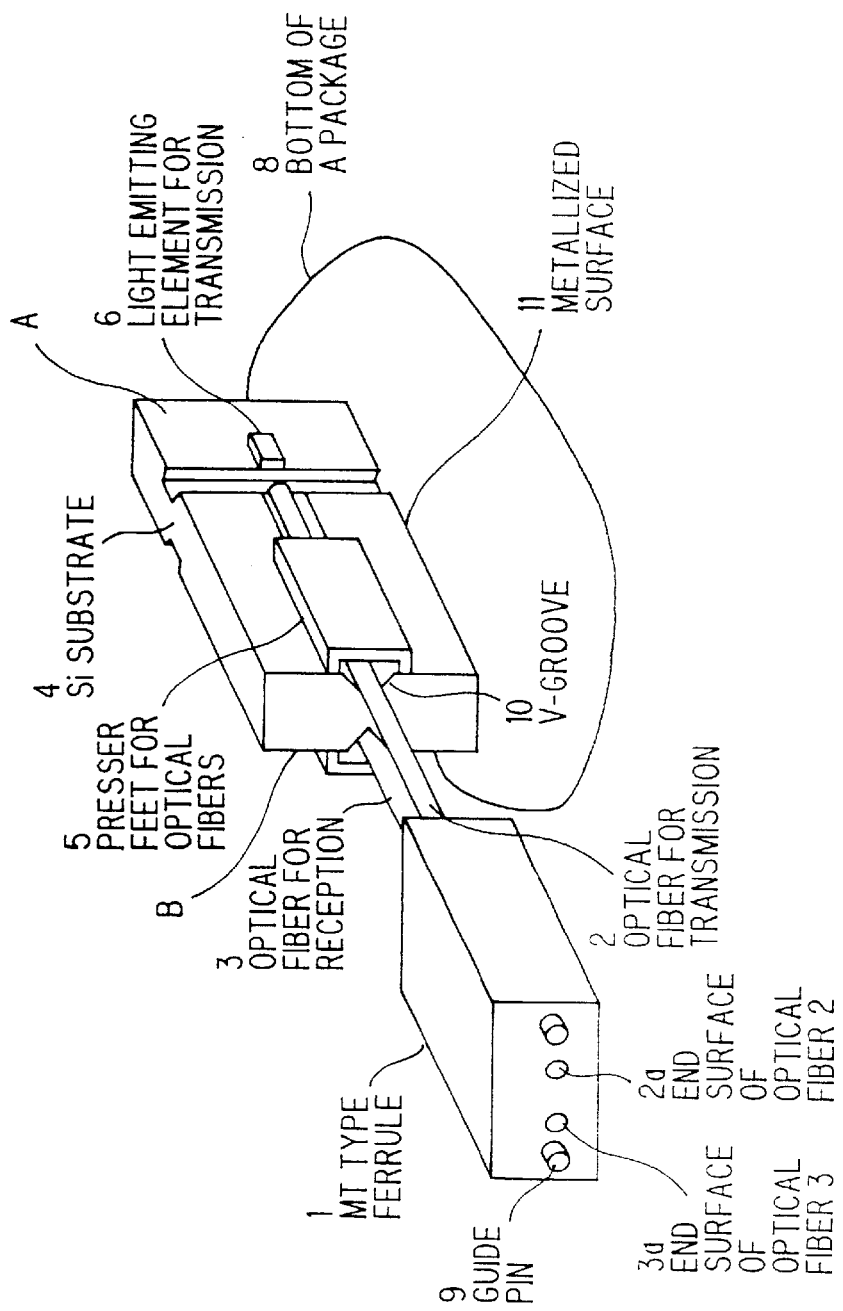
FIG. 1 is an exterior perspective view showing the first preferred embodiment of a two-way combination optical system unit according to the present invention.
Figure 2:
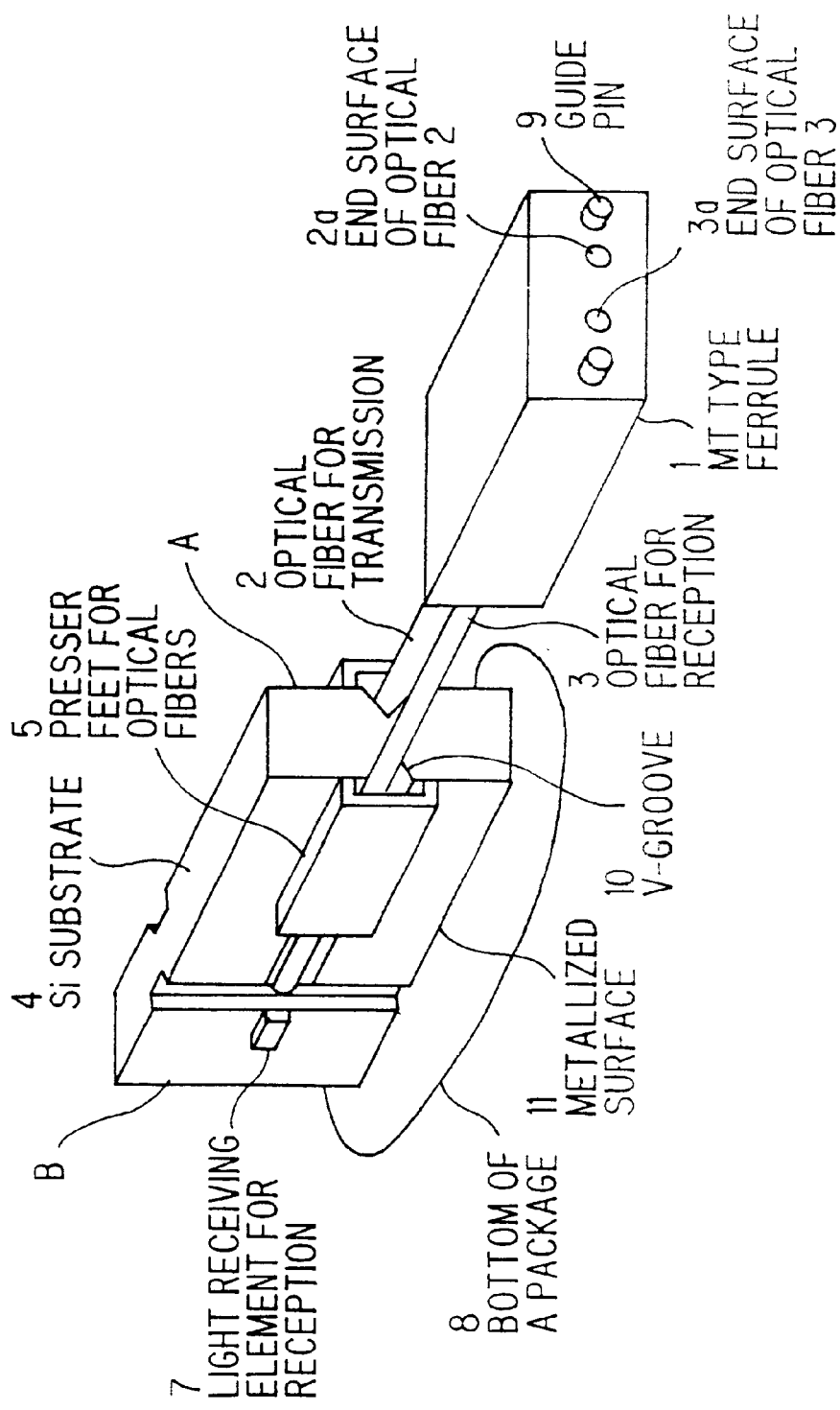
FIG. 2 is an exterior perspective view showing a side different from that of FIG. 1.

FIGS. 1 and 2 are exterior perspective views showing a constitutional example of a first preferred embodiment of the present invention wherein FIG. 1 is an exterior perspective view showing an exterior structure on the side of light emission, and FIG. 2 is an exterior structure on the side of light reception.

Referring to FIGS. 1 and 2, a two-way combination optical system unit of the first preferred embodiment of the invention comprises MT type ferrule 1, an optical fiber 2 for transmission, an optical fiber 3 for reception, an Si substrate 4, presser feet 5 for optical fibers, a light emitting element 6 for transmission, a light receiving element 7 for reception, and a package bottom 8.

In FIGS. 1 and 2, the optical fiber 2 for transmission and the optical fiber 3 for reception are fixed in V-grooves 10 defined on the opposite sides of the Si substrate 4 onto which the light emitting element 6 and the light receiving element 7 for reception are mounted. In this case, a distance defined between the optical fiber 2 for transmission and the optical fiber 3 for reception is matched with an optical fiber distance established in the MT type ferrule 1 by adjusting a thickness of the side of the Si substrate 4. As a result, the MT type ferrule 1 can be easily molded with respect to the optical fiber 2 for transmission and the optical fiber 3 for reception.

The MT type ferrule 1 contains the optical fiber 2 for transmission and the optical fiber 3 for reception therein by molding these optical fibers with epoxy resin, and the end surfaces 2a and 3a of these optical fibers 2 and 3 thus molded are polished. Furthermore, guide pins 9 for precisely positioning optical fibers are disposed on the molded surface thus polished.

On the opposite sides of the Si substrate 4, the light emitting element 6 and the light receiving element 7 are mounted, respectively. Further, the V-grooves 10 for mounting optical fibers are defined on the opposite sides of the Si substrate 4, and the optical fiber 2 for transmission and the optical fiber 3 for reception are mounted in the V-grooves 10, respectively. In this case, the light emitting element 6 and the light receiving element 7 are directly coupled with the optical fiber 2 for transmission and the optical fiber 3 for reception in an optical manner, respectively.

Moreover, a surface 11 on which no V-groove 10 has been defined in the Si substrate 4 is metallized, and the metallized surface 11 is mounted on the bottom of a package 8 by soldering the surface onto the bottom of the package 8.

Operations of a two-way combination optical system unit according to the present invention will be described in conjunction with FIGS. 1 and 2.

First, the optical fiber 2 for transmission and the optical fiber 3 for reception are mounted in the V-grooves 10 defined on the opposite sides of the Si substrate 4 on which the light emitting element 6 and the light receiving element 7 have been previously mounted, respectively, by the use of the presser feet 5 for optical fibers. Furthermore, extreme ends of both the optical fiber 2 for transmission and the optical fiber 3 for reception are molded with an epoxy-base resin. Moreover, the end surfaces of these optical fibers 2 and 3 are grounded together with the molded resin, and the guide pins 9 are provided on the grounded surface to form the MT type ferrule 1, whereby a two-way combination optical system unit for compact optical transceiver is formed.

In the above case, the Si substrate 4 has been fabricated to have a thickness which is equal to a distance defined between the optical fiber 2 for transmission and the optical fiber 3 for light reception mounted in the V-grooves 10 as well as to a distance between the optical fibers in the MT ferrule. For this reason, the MT ferrule 1 can be easily molded on the extreme ends of the optical fiber 2 for transmission and the optical fiber 3 for reception.

Advantages of the Si substrate for mounting optical fibers shown in FIGS. 1 and 2 are as follows.

First, since a fiber distance of the optical system unit is equal to that of the MT ferrule, it becomes possible to directly mold the MT ferrule onto the fibers contained in the optical system unit section. As a result, no polymer light waveguide for adjusting a distance between optical fibers becomes necessary, so that the structure thereof becomes simple. Further, as compared with the case where a polymer light waveguide is employed, one connection point decreases in a route between the optical fibers of the optical system unit section and the MT ferrule. Thus, connection loss between an optical semiconductor device and the MT ferrule can be reduced, whereby high light output and high light receiving sensitivity become possible.

Second, since an Si substrate exists between a transmitting section containing a light emitting element and a light receiving section containing a light receiving element, it becomes possible to improve electrical crosstalk appeared between transmission and light reception.

(Second Preferred Embodiment)

Next, a second preferred embodiment and a modification thereof will be described hereinafter in conjunction with FIGS. 3 to 5.

Figure 3:
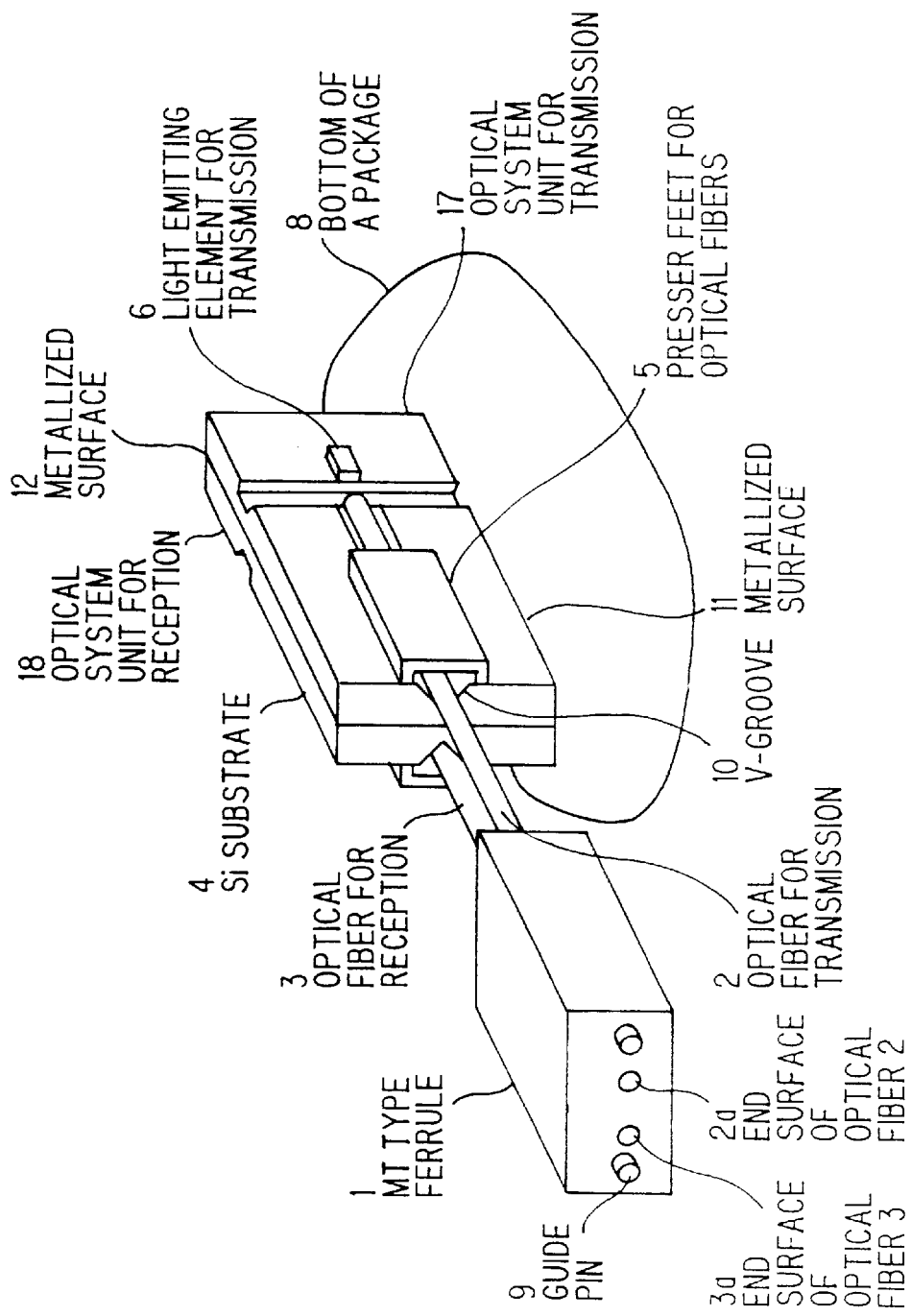
FIG. 3 is an exterior perspective view showing the second preferred embodiment of a two-way combination optical system unit according to the present invention.

Referring to FIG. 3, an optical system unit 17 for transmission is constituted in such that a V-groove 10 for mounting an optical fiber is defined on either side of an Si substrate loaded with a light emitting element 6, and an optical fiber 2 for transmission is mounted in the V-groove 10. Further, the backside of the Si substrate 4 is wholly metallized 12. In accordance with the same manner as that described above, an optical system unit 18 for reception is also constituted in such that a V-groove 10 for mounting an optical fiber is defined on either side of an Si substrate loaded with a light receiving element 7, and an optical fiber 3 for reception is mounted in the V-groove 10. Moreover, the backside of the Si substrate 4 is metallized 12 as in the case of the optical system unit for transmission. This optical system unit 17 for transmission is soldered to the optical system unit 18 for reception in the metallized surfaces 12 of both the backsides of the Si substrates 4. By the structure thus obtained, advantages are also achieved. In addition, when the metallized surfaces 12 existing between both the Si substrates 4 and the soldered layer are grounded, an effect for suppressing electrical crosstalk can be more increased than the structure in the former preferred embodiment.

Figure 4:
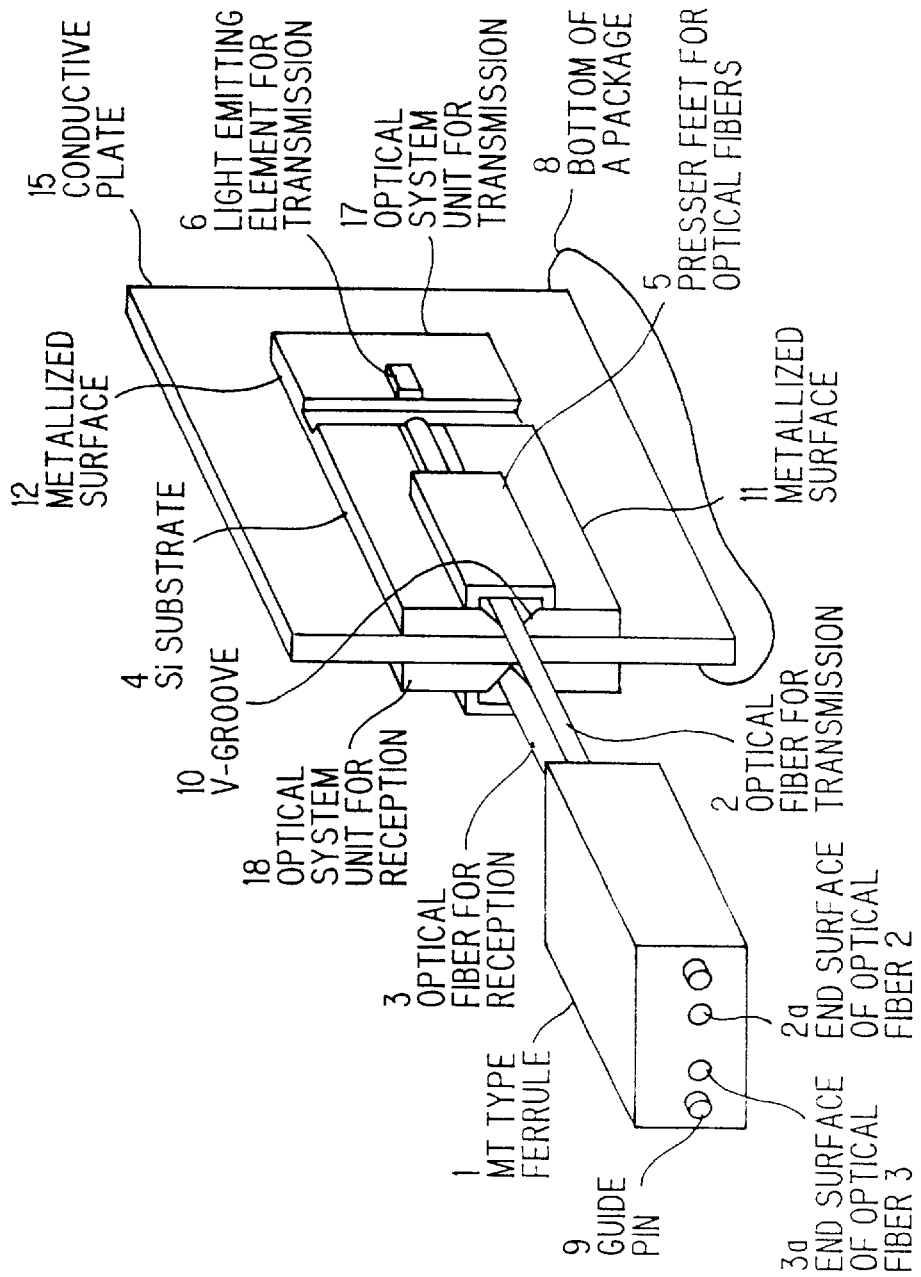
FIG. 4 is an exterior perspective view showing the first modification of the second preferred embodiment.

FIG. 4 is an exterior perspective view showing a first modification of the second preferred embodiment. Referring to FIG. 4, a two-way combination optical system unit is constituted in such that a conductive plate 15 made of a metal and the like is sandwiched between an optical system unit 17 for transmission and an optical system unit 18 for light reception, and they are grounded in the bottom of a package 8. In also this structure wherein a material and a size of the conductive plate 15 are modified, the same advantage as that of the first preferred embodiment can be achieved, so that crosstalk appeared between transmission and reception can be suppressed.

Figure 5:
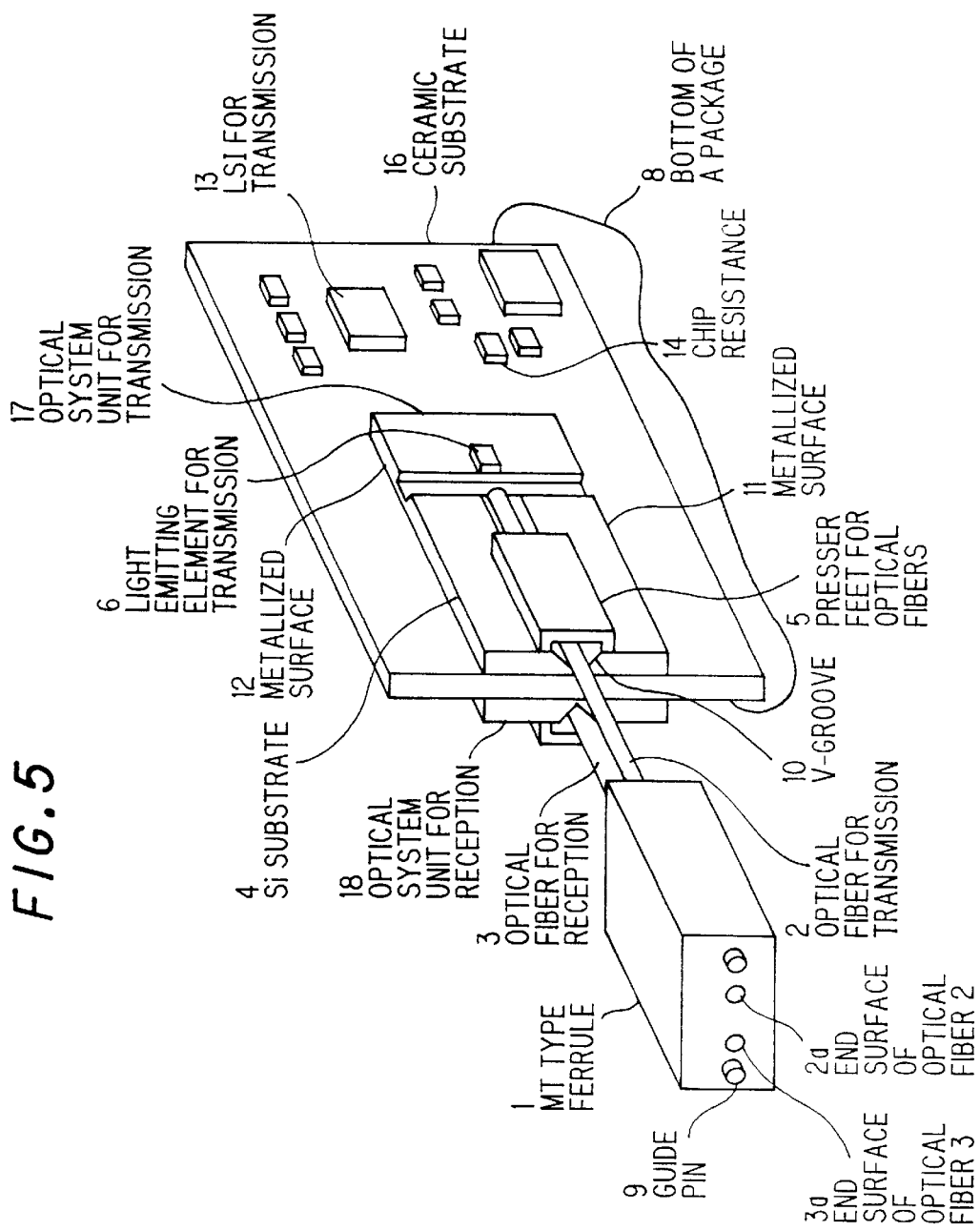
FIG. 5 is an exterior perspective view showing the second modification of the second preferred embodiment.

FIG. 5 is an exterior perspective view showing a second modification of the second preferred embodiment wherein a receiver is constituted by mounting an optical system unit 17 for transmission onto a ceramic substrate 16 to which an LSI 13 for transmission and chip resistances 14 have been mounted. Moreover, although it is not shown in FIG. 5, a receiver is constituted by mounting an LSI for reception and an optical system unit 17 for light reception onto the backside of the ceramic substrate 16.

In also the structure described above, the same advantages as those of the first preferred embodiment are obtained. Furthermore, since a transmitting circuit and a light-receiving circuit can be constituted on the ceramic substrate 16, it becomes possible to downsize a receptacle type optical transceiver.

As is apparent from the above description, a two-way combination optical system unit according to the present invention is constituted in such that a V-groove having a V-shaped profile is defined on a side A of a prescribed substrate, and a light emitting element is mounted on the side A, while a V-groove having a V-shaped profile is defined on a side B, and a light receiving element is mounted on the side B, thereafter, an optical fiber for light emission coupled to the light emitting element is integrally molded together with an optical fiber coupled to the light receiving element. Thus, when a thickness of the substrate is made to be equal to a distance defined between both the optical fibers for transmission and reception as well as to a distance defined between optical fibers in an optical connector, a polymer light waveguide for adjusting fiber distance is not required. As a result, an optical system unit of the present invention can be constituted in the form of an integrated combination containing no jointed position without applying any stress to the optical fibers used therein.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A two-way combination optical system unit, comprising:
    a light emitting element mounted on a side of a first prescribed substrate on which a V-shaped groove has been defined,
    a light receiving element mounted on a side of a second prescribed substrate on which a V-shaped groove has been defined, said sides of said first and second substrates being opposite each other, and
    a molded optical connector in which an optical fiber for light transmission connected to said light emitting element is molded integrally with an optical fiber for light reception connected to said light receiving element, and end surfaces of the optical fibers are exposed on a side surface thereof to be served for light transmitting and receiving ends.

2. The two-way combination optical system unit as defined in claim 1, wherein the side of said first prescribed substrate and the side of said second prescribed substrate are the sides of a common substrate which are opposite to each other.

3. The two-way combination optical system unit as defined in claim 2, wherein said common substrate is an Si substrate, and a distance defined between said optical fiber for light transmission and said optical fiber for light reception is allowed to coincide with a distance between the optical fibers required for said optical connector.

4. The two-way combination optical system unit as defined in claim 1, wherein said first prescribed substrate is a substrate different from said second prescribed substrate, and the other side opposite to the side of said first prescribed substrate is bonded to the other side opposite to the side of said second prescribed substrate each other.

5. The two-way combination optical system wait as defined in claim 4, wherein said first and second prescribed substrates are Si substrates, a distance defined between said optical fiber for light transmission and said optical fiber for light reception is allowed to coincide with a distance between the optical fibers required for said optical connector.

6. The two-way combination optical system unit as defined in claim 4, wherein surfaces of said first and second prescribed substrates are metallized.

7. The two-way combination optical system unit as defined in claim 6, wherein said surfaces metallized are conductive so as to be capable of ground connection.

8. The two-way combination optical system unit as claimed in any one of claims 1, wherein one or both of the sides of said first and second prescribed substrates are bonded to a surface of a prescribed package.

9. The two-way combination optical system unit as defined in claim 8, wherein the surface of said package is conductive to be grounded.

10. The two-way combination optical system unit as defined claim 1 said molded optical connector is provided on said side surface thereof with guide pins for positioning said optical fibers for transmission and reception.

11. A two-way combination optical system unit, comprising:
    a substrate having first and second opposing sides, each of said first and second sides having a V-shaped groove;
    a light emitting element mounted on said first side;
    a light receiving element mounted on said second side;
    a light transmitting optical fiber being in said V-shaped groove and connected to said light emitting element;
    a light receiving optical fiber being in said V-shaped groove and connected to said light receiving element; and
    a molded optical connector containing said light transmitting and light receiving optical fibers.

12. The two-way combination optical system unit as defined in claim 11,
    wherein said substrate is silicon, and
    wherein a distance between said light transmitting optical fiber and said light receiving optical fiber coincides with a distance between optical fibers required for said optical connector.

13. The two-way combination optical system unit as defined in claim 11, wherein a third side of said substrate is bonded to a surface of a package.

14. The two-way combination optical system unit as defined in claim 13, wherein the surface of said package is conductive to be grounded.

15. The two-way combination optical system unit as defined in claim 11, wherein said molded optical connector further comprises guide pins for positioning said transmitting and receiving optical fibers.

* * * * *